Patented Oct. 12, 1948

2,451,427

UNITED STATES PATENT OFFICE 2,451,427

HYDROXYTHIOPHANE CARBOXYLIC ACIDS AND ESTERS AND METHODS OF PREPARING SAME

Bernard R. Baker, Nanuet, N. Y., assignor, by mesne assignments, to American Cyanamid Company, New York, N. Y., a corporation of Maine No Drawing. Application July 16, 1945,
Serial No. 605,465

9 Claims. (Cl. 260—329)

This invention relates to new organic compounds and to methods of preparing the same. More particularly, it relates to hydroxythiophane dicarboxylic acids and esters thereof.

The novel compounds may be illustrated by the following general formula:

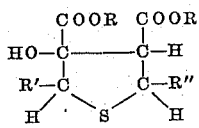

wherein R is a hydrogen, alkyl or cationic salt forming radical and R' and R'' are hydrogen, alkyl, phenoxyalkyl, carboxy, carboxyalkyl or carbalkoxyalkyl radicals.

The compounds of the present invention are viscous oils or gums, varying in color from amber to brown. They are soluble in most organic solvents and are soluble in aqueous solutions of mild alkalis such as sodium or potassium bicarbonate.

I prepare the compounds of the present invention by heating a carbalkoxy thiophane cyanohydrin with a mineral acid in a suitable solvent. Esters of these compounds can be prepared by heating the compounds with the corresponding alcohol in the presence of a mineral acid.

The carbalkoxy thiophane cyanohydrins used as intermediates in the present invention are prepared by reacting a carbalkoxy ketothiophane with liquid hydrocyanic acid in the presence of an alkaline salt of hydrocyanic acid, as shown in the specific examples.

A large number of carbalkoxy thiophane cyanohydrins can be used as intermediates. Among these may be specifically mentioned: 2-propyl-3-carbethoxy - 4 - hydroxy - 4 - cyanothiophane, 2 - propyl - 3 - carbomethoxy - 4 - hydroxy - 4 - cyanothiophane, 2-propyl-3-carbopropoxy-4-hydroxy-4-cyanothiophane, 2-propyl-3-hydroxy-3-cyano-4-carbomethoxythiophane, 2-propyl-3-hydroxy-3-cyano-4-carbethoxythiophane, 2 - phenoxypropyl - 3 - carbethoxy - 4 - hydroxy - 4 - cyanothiophane, 2-phenoxypropyl-3-carbomethoxy - 4 - hydroxy - 4 - cyanothiophane, 2 - phenoxypropyl - 3 - carbopropoxy - 4 - hydroxy - 4 - cyanothiophane, 2-phenoxypropyl-3-hydroxy-3-cyano-4-carbomethoxythiophane, 2-chlorophenoxypropyl - 3 - carboxy - 4 - hyroxy - 4 - cyano - noxypropyl - 3 - carboxy - 4 - hyroxy - 4 - cyano - thiophane, 2 - chlorophenoxyproypl - 3 - carbethoxy - 4 - hydroxy - 4 - cyanothiophane, 2 - chlorophenoxypropyl - 3 - carbomethoxy-4-hydroxy-4 - cyanothiophane, 2-(δ-carbethoxybutyl)-3-hydroxy - 3 - cyano - 4 - carbethoxythiophane, 2 - (δ-carbomethoxybutyl) - 3 - carbomethoxy - 4-hydroxy-4-cyanothiophane, and the like.

In carrying out the present invention I mix a carbalkoxy thiophane cyanohydrin with a solvent such as acetic acid, propionic acid or other organic acid, water, dioxane, etc. or mixture thereof. A mineral acid is then added to the reaction mixture. The reaction takes place at a temperature of from about 20° C. to about 120° C. in from about 6 hours to about 72 hours depending upon the particular temperature used. A convenient method of conducting the reaction is to mix the reactants in a suitable solvent or diluent and heat the mixture at refluxing temperatures until the reaction is complete, usually within about 12 hours to about 24 hours.

The desired product may be obtained from the reaction mixture by diluting the mixture with water and extracting with a water immiscible solvent such as ethyl acetate, carbon tetrachloride, benzene, etc. I can also obtain the product by evaporating the reaction mixture to dryness and extracting the residue with acetone, ethyl acetate or hydroxylated solvents. However, I prefer to dilute the reaction mixture with water and then add a salt such as sodium chloride to salt out the product, which separates as an oil and is then extracted with a water immiscible solvent. The solvent containing the product is extracted with aqueous sodium bicarbonate, acidified and again extracted with a water immiscible solvent. Evaporation of the solvent gives the product usually in the form of a viscous liquid or gum.

Salts of compounds of the present invention can be prepared by heating the compounds with an alkali metal hydroxide in a suitable solvent.

In order that the nature of the invention may become more apparent the following compounds are among those that may be prepared by the process described herein and are listed as falling within the scope of the present invention:
2 - propyl - 4 - hydroxythiophane - 3,4 - dicarboxylic acid, 2-propyl-3-hydroxythiophane-3,4-dicarboxylic acid, 2 - phenoxypropyl - 4 - hydroxythiophane-3,4-dicarboxylic acid, 2-phenoxypropyl-3-hydroxythiophane-3,4-dicarboxylic acid, 2-chlorophenoxypropyl - 4 - hydroxythiophane-3,4-dicarboxylic acid, 2 - chlorophenoxypropyl - 3 - hydroxythiophane-3,4-dicarboxylic acid, 2-(δ-carboxybutyl)-3-hydroxythiophane-3,4-dicarboxylic acid, 2-(δ-carboxybutyl) - 4 - hydroxythiophane- 3,4-dicarboxylic acid, and the like.

The compounds of the present invention are useful as intermediates in the preparation of antivitamins and vitamins, such as biotin.

My invention will now be illustrated in greater detail by means of the following specific examples, in which representative carbalkoxythiophane cyanohydrins are hydrolyzed under different conditions to give dicarboxy hydroxythiophanes. It will be understood, of course, that these examples are given for purposes of illustration and are not to be considered as limiting my invention to the particular details described therein.

Example I

To the dry sodium ethylate from 5.8 g. of sodium obtained by evaporating the alcoholic solution to dryness in vacuo was added in nitrogen atmosphere 27.5 g. of ethyl thioglycolate in 50 cc. of benzene followed by 33.6 g. of ethyl 2-hexenoate in 25 cc. of benzene. After being refluxed for three hours the solution was extracted with ice water and iced 3% sodium hydroxide. The aqueous extracts were acidified and extracted with benzene. Distillation gave 33.5 g. (68%) of 2-propyl-3-carbethoxy-4-ketothiophane, as an oil, boiling point 109°–111° C. (1 mm.).

To a mixture of 6 cc. of hydrogen cyanide and 21.6 g. of 2-propyl-3-carbethoxy-4-ketothiophane cooled to 0° C. was added four drops of 50% potassium hydroxide. After 20 hours at about 0° C., the mixture was acidified with sulfuric acid and distilled from potassium bisulfate on redistillation 19 g. (78%) of 2-propyl-3-carbethoxy-4-hydroxy-4-cyanothiophane having a boiling point of 135°–139° C. (1 mm.) was obtained.

A mixture of 4.7 g. of 2-propyl-3-carbethoxy-4-hydroxy-4-cyanothiophane, 10 cc. of acetic acid and 25 cc. of concentrated hydrochloric acid was refluxed fifteen hours and diluted to 100 cc. with water. After saturation with sodium chloride, the solution was extracted twice with ethyl acetate, then evaporated to dryness in vacuo. A yield of 4.5 g. of 2-propyl-4-hydroxythiophane-3,4-dicarboxylic acid was obtained.

Example II

A mixture of 50 g. of 2-propyl-3-carbethoxy-4-cyano-4-hydroxythiophane, 100 cc. of acetic acid and 250 cc. of concentrated hydrochloric acid was treated as in Example I. A yield of 46.6 g. (97%) of 2-propyl-4-hydroxythiophane-3,4-dicarboxylic acid was obtained.

Example III

A mixture of 15.5 g. of 2-(γ-phenoxypropyl)-3-carbomethoxy-4-hydroxy-4-cyanothiophane, 40 cc. of acetic acid, 14 cc. of concentrated sulfuric acid and 100 cc. of water was refluxed for twelve hours, then diluted to 500 cc. with water. The oil was extracted with ethyl acetate, the latter in turn extracted with aqueous sodium bicarbonate, acidified and again extracted with ethyl acetate. Evaporation of the solvent left 6.9 g. of a viscous liquid which when analyzed for carbon and hydrogen was in close agreement with the theoretical values for 2-(γ-phenoxypropyl)-4-hydroxythiophane-3,4-dicarboxylic acid.

Example IV

A mixture of the cyanohydrin from 22 g. of 2-(γ-phenoxypropyl)-3-keto-4-carbomethoxy-thiophane, 50 cc. of water and 15 cc. of concentrated sulfuric acid was refluxed for twenty-four hours, cooled and extracted with ethyl acetate. The latter was extracted twice with dilute aqueous sodium bicarbonate. Acidification gave an oil which was extracted with ethyl acetate and washed twice with 1% aqueous sodium chloride. Evaporation gave 13.7 g. of 2-(γ-phenoxypropyl)-3-hydroxythiophane-3,4-dicarboxylic acid as an amber gum. The ethyl acetate solution of sodium bicarbonate insoluble material gave 7.3 g. of an oil on evaporation which still contained 1.94% nitrogen. The oil was refluxed twenty-four hours with 40 cc. of water and 10 cc. of concentrated sulfuric acid, then worked up as described above. An additional 1.4 g. of hydroxy acid was obtained.

Example V

From 14.3 g. of 2-(γ-chlorophenoxypropyl)-3-keto-4-carbomethoxythiophane treated as in Example IV, was obtained 6.8 g. of 2-(γ-chlorophenoxypropyl)-3-hydroxythiophane-3,4-dicarboxylic acid as a semicrystalline yellow gum.

Example VI

A mixture of 10.3 g. of 2-propyl-4-hydroxythiophane-3,4-dicarboxylic acid, 25 cc. of methanol, 75 cc. of chloroform and 2.5 cc. of concentrated sulfuric acid was refluxed for twenty-two hours with continuous drying. The mixture was washed with water, dilute sodium bicarbonate solution and then distilled. A yield of 8.4 g. (74%) of 2-propyl-4-hydroxy-3,4-dicarbomethoxythiophane was obtained as a light yellow oil, boiling point 135°–138° C. (1 mm.).

Example VII

To 41 g. of the cyanohydrin (prepared from 3-keto-4-carbomethoxythiophane and hydrogen cyanide) was added 70 cc. of acetic acid and 165 cc. of concentrated hydrochloric acid and the mixture refluxed for twenty-two hours. After dilution with 100 cc. of water, the solution was clarified with Norite and evaporated to dryness in vacuo. The residue was dissolved in 100 cc. of water and again evaporated in vacuo. The evaporation with 100 cc. of water was repeated once more. The residue was dissolved in 150 cc. of acetone and filtered from the insoluble ammonium chloride. Evaporation gave a quantitative yield of 3-hydroxythiophane-3,4-dicarboxylic acid as a buff-colored solid.

I claim:

1. Chemical compounds having the following formula:

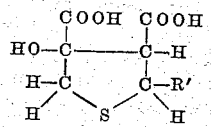

wherein R' is a carboxyalkyl radical.

2. 2-(δ-carboxybutyl)-4-hydroxythiophane-3,4-dicarboxylic acid.

3. 2-(δ-carboxybutyl)-3-hydroxythiophane-3,4-dicarboxylic acid.

4. 2-(γ-phenoxypropyl)-3-hydroxythiophane-3,4-dicarboxylic acid.

5. A method of preparing compounds corresponding to the general formula:

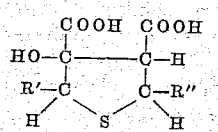

wherein R' and R'' are members of the group consisting of hydrogen, alkyl, phenoxyalkyl, and carboxyalkyl radicals which comprises heating a compound having the general formula:

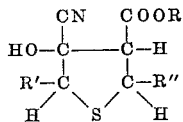

wherein R is alkyl and R' and R'' are members of a group consisting of hydrogen, alkyl, phenoxyalkyl, and carbalkoxyalkyl with a mineral acid in the presence of a solvent for said thiophane cyanohydrin.

6. A method of preparing 2-(δ-carboxybutyl)-4-hydroxythiophane-3,4-dicarboxylic acid which comprises heating 2-(δ-carbethoxybutyl)-3-carbethoxy-4-cyano-4-hydroxythiophane with a mineral acid in the presence of a solvent for said thiophane cyanohydrin.

7. A method of preparing 2-(δ-carboxybutyl)-3-hydroxythiophane-3,4-dicarboxylic acid which comprises heating 2-(δ-carbethoxybutyl)-3-cyano-3-hydroxy-4-carbethoxythiophane with a mineral acid in the presence of a solvent for said thiophane cyanohydrin.

8. A method of preparing 2-(γ-phenoxypropyl)-3-hydroxythiophane-3,4-dicarboxylic acid which comprises heating 2-(γ-phenoxypropyl)-4-carbomethoxy-3-cyano-3-hydroxythiophane with a mineral acid in the presence of a solvent for said thiophane cyanohydrin.

9. Chemical compounds having the following formula:

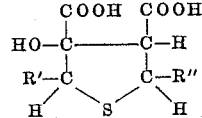

wherein R' and R'' are members of the group consisting of hydrogen, alkyl, phenoxyalkyl and carboxyalkyl radicals.

BERNARD R. BAKER.

REFERENCES CITED

The following references are of record in the file of this patent:

Surrey: J. Am. Chem. Soc., 66, 1933–35 (1944).
Richter: "Textbook of Organic Chemistry," page 491. Published by Wiley, New York, 1938.